Patented Aug. 26, 1941

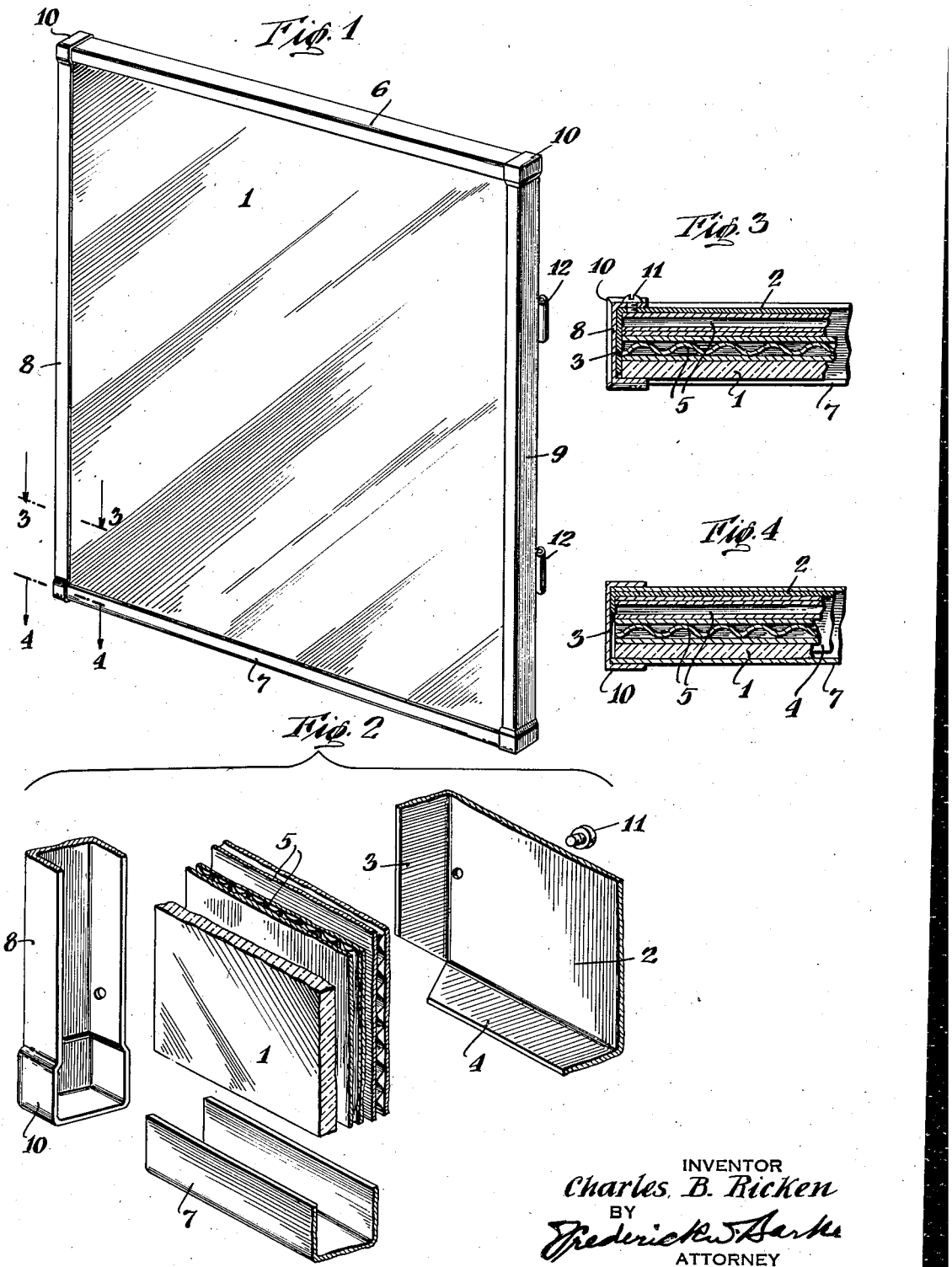

2,254,190

UNITED STATES PATENT OFFICE 2,254,190

MIRROR DOOR FOR CABINETS

Charles B. Ricken, Brooklyn, N. Y., assignor of one-half to Garry M. Ketcham, Jr., Brooklyn, N. Y.

Application October 6, 1939, Serial No. 298,268

2 Claims. (Cl. 189—36)

This invention relates to mirror doors for cabinets, and my improvement is directed to a simplified construction of the mirror frames whereby they may be produced more economically and with less labor, besides proving more durable, than as previously known in this art.

Heretofore mirror doors have been composed of channels forming a rectangular frame, within which frame the mirror is secured, the frame channels being united at the corners by individual socket members.

Therefore I have devised and put into practice the new frame construction whereby the use of the corner sockets is avoided and instead the four channel members which constitute a frame are caused to become directly interengaged.

In accomplishing this result, two parallel channels, which may be those at the top and bottom of the frame, have plain ends, these channels fitting over the mirror, while the other two parallel channels, which also fit over the mirror, as at the sides thereof, have swelled or socket-like ends adapted to receive the plain ends of the first named channels, to thus complete the rectangular frame construction.

In this interfitted engaged relation the frame channels are secured together as by the use of screws or other suitable means.

A backing plate, secured within the channels, with flanges that lie against the channel webs, is also provided, and suitable filler means are interposed between the mirror back and said backing plate.

Other features and advantages of my invention will hereinafter appear.

In the drawing:

Figure 1 is a perspective elevation of a mirror door according to my invention.

Fig. 2 is an exploded view, in perspective, showing portions of the respective elements composing the mirror door.

Fig. 3 is a section taken on the line 3—3 of Fig. 1, and

Fig. 4 is a section taken on the line 4—4 of Fig. 1.

In said figures let 1 indicate a mirror, 2 a back plate therefor having flanges 3, 4, and 5 filling material such for example as corrugated and flat cardboard, to serve as a cushion.

In the example illustrated I have shown the channels 6, 7, which respectively engage the mirror, with its backing means, at top and bottom thereof. These channels have plain end portions, in contradistinction to the ends of the side channels 8, 9, which latter channels have their end portions formed into sockets 10, adapted to receive the plain ends of channels 6, 7.

The sockets 10 are formed as by stamping them out of the channel material. Screws 11 are entered through the rear flange of the side channels and into tapped holes in the back plate 2, thereby integrating the frame and securing the mirror therein, together with the back plate and filling.

Hinge members 12 are shown as applied to one of the side channels.

Variations within the spirit and scope of my invention are equally comprehended by the foregoing disclosure.

I claim:

1. A mirror door frame composed of opposed pairs of elements each comprising parallel sides connected by a web to engage and enclose respectively the mirror top and bottom and the mirror sides, each of said elements of one pair thereof having said parallel sides equi-distantly spaced the entire length of the elements, and each of said elements of the other pair thereof having the parallel sides equi-distantly spaced a major portion of the entire length of the elements but said sides at each end of the elements expanded to increase the distance between said sides, and an end wall provided at each end of the elements to thereby form end sockets in each of said elements of one pair thereof receiving the ends of the elements of the other pair, the edge of the sides and web of said other pair abutting against the base of each socket.

2. A mirror door frame composed of opposed pairs of channel elements each comprising parallel sides connected by a web to engage and enclose respectively the mirror top and bottom and the mirror sides, each of said sides and webs of said elements of one pair thereof extending in the same plane the entire length of said elements, and each of said sides and webs of said elements of the other pair thereof extending in the same plane a major portion of the length of said elements but at each end thereof expanded to dispose said sides and webs outside the planes of the major portions thereof, and an end wall provided at each end of the elements whereby sockets are provided on the ends of each of said elements of one pair thereof receiving the ends of the elements of the other pair, the edge of the sides and web of said other pair abutting against the base of each socket.

CHAS. B. RICKEN.